United States Patent [19]

Ullrich et al.

[11] Patent Number: 5,453,056
[45] Date of Patent: Sep. 26, 1995

[54] BELT PULLEY

[75] Inventors: Günter Ullrich, Hemsbach; Winfried Ochs, Alsbach-Haehnlein; Herwig Hönlinger, Gross-Rohrheim, all of Germany

[73] Assignee: Firma Carl Freudenberg, Weinheim, Germany

[21] Appl. No.: 229,033

[22] Filed: Apr. 18, 1994

[30] Foreign Application Priority Data

Apr. 27, 1993 [DE] Germany ............... 43 13 755.5

[51] Int. Cl.⁶ ................................. F16H 55/14
[52] U.S. Cl. ............... 474/94; 474/161; 474/191; 474/902
[58] Field of Search ................. 474/161, 166, 474/902, 94, 191; 74/574

[56] References Cited

U.S. PATENT DOCUMENTS

| | | | |
|---|---|---|---|
| 2,972,904 | 2/1961 | Troyer | 74/574 |
| 3,058,371 | 10/1962 | Haushalter | 74/574 |
| 3,078,737 | 2/1963 | McGravern | 74/574 |
| 3,108,490 | 10/1963 | Turlay | 74/574 |
| 3,428,034 | 2/1969 | MacAfee et al. | 74/574 |
| 3,479,907 | 11/1969 | Hall | 74/574 |
| 4,355,990 | 10/1982 | Duncan | 474/94 |
| 4,593,924 | 10/1985 | Bostock et al. | 474/161 X |
| 4,736,510 | 4/1988 | Jorg et al. | 74/574 X |
| 4,882,944 | 11/1989 | Vohl | 474/166 X |
| 5,231,893 | 8/1993 | Sisco et al. | 74/574 |
| 5,409,423 | 4/1995 | Ullrich et al. | |

*Primary Examiner*—Roger J. Schoeppel
*Attorney, Agent, or Firm*—Kenyon & Kenyon

[57] ABSTRACT

A belt pulley with a substantially cup-shaped profile that is delimited on one side, in at least the axial direction, by an integrally shaped-on rim flange is disclosed. The rim flange is configured as the hub ring of a torsional vibration damper, the hub ring being connected, by means of a damping ring made of elastomeric material, to an inertial ring.

2 Claims, 1 Drawing Sheet

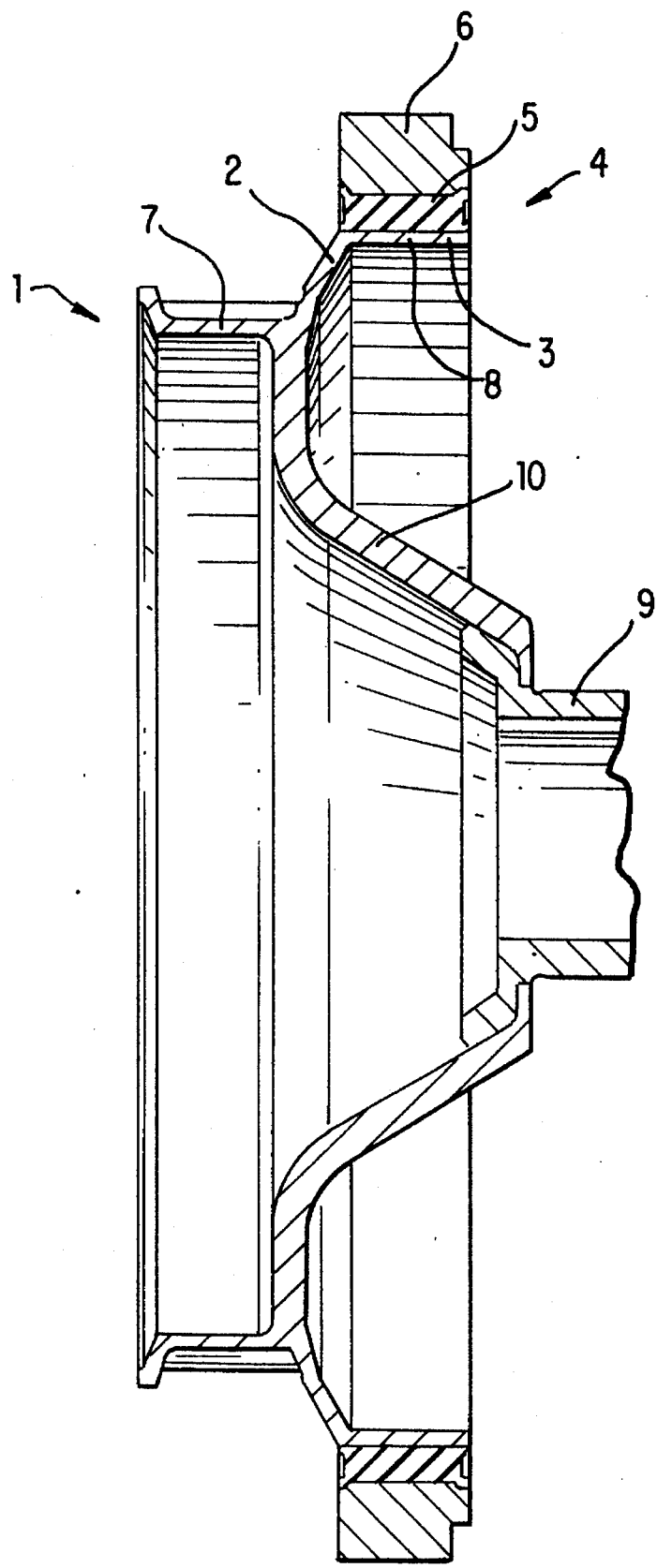

BELT PULLEY

BACKGROUND OF THE INVENTION

The invention relates generally to a belt pulley with a substantially cup-shaped profile that is delimited on one side, in at least the axial direction, by an integrally shaped-on rim flange.

Belt pulleys of this general type are known and are utilized, for example, to drive accessories in motor vehicles. To allow damping of vibrations that occur, it is possible, for example, to provide a torsional vibration damper that is separately produced and fastened to the belt pulley. It must be noted in this connection, however, that the two-part configuration of belt pulley and torsional vibration damper is less than satisfactory in terms of installation procedure and economy.

There remains a need for the further development of a belt pulley of the generally known type that is easy to manufacture and install, and possesses good vibration-damping properties.

SUMMARY OF THE INVENTION

This need is met by the present invention, in which a belt pulley is provided with a belt contact pulley having axially displaced ends, a web extending inwardly from the belt contact pulley; a rim flange integrally formed with the belt pulley and connected to an axial end of the belt pulley; and a torsional vibration damper. In the present invention, provision is made for the rim flange to be configured as the hub ring of a torsional vibration damper, and for the hub ring to be connected, by means of a damping ring made of elastomeric material, to an inertial ring. It is advantageous in this regard that the torsional vibration damper is configured integrally with the rim flange, which simplifies the manufacture of the component and its installation (e.g., on an internal combustion engine). The torsional vibration damper can correspond, in its configuration, to known torsional vibration dampers; the damping ring, which is arranged between the hub and inertial rings and supports the two parts against one another in a torsionally elastic manner, can be molded in or vulcanized.

According to one embodiment, the rim flange can be provided, in the region of its radial boundary, with a projection that is integrally shaped on and crimped axially in the opposite direction from the belt contact surface, and constitutes the hub ring, the hub ring being surrounded on the outer and/or inner periphery by the damping ring and inertial ring. The belt contact surface and the projection are generated by the fact that the radially extending belt pulley body is split, and the resulting portions are each shaped in opposite axial directions. Subsequent to shaping, the profile of the belt contact surface is generated, and additionally the torsional vibration damper is completed in the axial direction.

BRIEF DESCRIPTION OF THE DRAWING

The FIGURE is a cross-sectional view of a belt pulley constructed according to the principles of the invention.

DETAILED DESCRIPTION

The FIGURE schematically shows an exemplary embodiment of a belt pulley 1 according to the invention in a cross-sectioned depiction. Belt pulley 1 comprises a belt pulley body, which has a belt contact surface 7 non-rotatably connected to a drive 9. Drive 9 can, for example, be of the crankshaft of an internal combustion engine. The drive 9 and belt contact surface 7 are joined by a connecting web 10 having substantially an "S" shape in cross-section. Belt pulley 1 is provided, on the axial boundary facing drive 9, with a rim flange 2 that is integrally joined to the belt pulley body. The rim flange 2 is shaped to provide a transition from the radial to the axial direction. Projection 8, extending axially from the rim flange away from the belt contact surface 7, forms a hub ring 3 for a torsional vibration damper 4. In this exemplary embodiment, the hub ring 3 and an inertial ring 6 are adhesively joined to one another by means of a damping ring 5 made of elastomeric material. The integral configuration of belt pulley 1 and torsional vibration damper 4, which form a preassembled unit, considerably simplifies installation on drive 9. The simple configuration allows for economical manufacture.

In a further embodiment, the shape of belt contact surface 7 deviates from that shown here, as do the relative dimensions and shape of the damping ring 5 and the inertial ring 6.

What is claimed is:

1. A belt pulley comprising:

a belt contact pulley having a belt contact surface and axially displaced ends;

a web extending integrally and inwardly from one of the axial ends of the belt contact pulley;

a rim flange integrally formed with the belt contact pulley and connected to an axial end of the belt contact pulley;

a torsional vibration damper comprising an inertial ring, a damping ring made of elastomeric material connected to the inertial ring, and a hub ring connected to the damping ring, wherein the rim flange is configured for use as the hub ring and extends from the web in a direction axially opposed from the belt contact pulley, and wherein the belt pulley has a substantially cup-shaped profile.

2. A belt pulley according to claim 1, wherein the rim flange has a radial boundary, and wherein the rim flange includes a projection on its radial boundary that is integrally formed with the belt contact pulley and crimped axially in the opposite direction from the belt contact surface, said projection serving as the hub ring; and the hub ring is surrounded on the outside of the ring by the damping ring and the inertial ring.

* * * * *